(12) United States Patent
Rutz et al.

(10) Patent No.: US 9,540,778 B2
(45) Date of Patent: Jan. 10, 2017

(54) ROAD FINISHING MACHINE WITH A THERMOGRAPHIC DEVICE

(71) Applicant: JOSEPH VOEGELE AG, Ludwigshafen/Rhein (DE)

(72) Inventors: Arnold Rutz, Ludwigshafen (DE); Henning Delius, Hanhofen (DE); Martin Buschmann, Neustadt (DE); Tobias Gotterbarm, Limburgerhof (DE); Christian Pawlik, Neustadt (DE)

(73) Assignee: JOSEPH VOEGELE AG (DE)

(*) Notice: Subject to any disclaimer, the term of this patent is extended or adjusted under 35 U.S.C. 154(b) by 0 days.

(21) Appl. No.: 15/180,434

(22) Filed: Jun. 13, 2016

(65) Prior Publication Data

US 2016/0281304 A1    Sep. 29, 2016

Related U.S. Application Data

(63) Continuation of application No. 14/249,691, filed on Apr. 10, 2014, now Pat. No. 9,394,653.

(30) Foreign Application Priority Data

Apr. 12, 2013    (EP) .................................... 13163570

(51) Int. Cl.
*E01C 23/01* (2006.01)
*G01J 5/02* (2006.01)
(Continued)

(52) U.S. Cl.
CPC ................ *E01C 23/01* (2013.01); *G01J 5/025* (2013.01); *G01J 5/045* (2013.01); *G01J 5/048* (2013.01);
(Continued)

(58) Field of Classification Search
CPC .......... E01C 19/48; E01C 23/01; G01J 5/025; G01J 5/045; G01J 5/048; G01J 2005/0077; G01J 2005/0081; G06K 9/00791; H04N 5/33
(Continued)

(56) References Cited

U.S. PATENT DOCUMENTS 5,599,133 A    2/1997    Costello et al.
5,745,051 A    4/1998    Doherty et al.
(Continued)

FOREIGN PATENT DOCUMENTS

CN          101446059 A      6/2009
DE     1020008058481 A1      7/2009
(Continued)

OTHER PUBLICATIONS

E1—Joseph Vögele AG, Ludwigshafen: "Vögele Einbaufibel", www.voegele.info, Stand Oct. 2012, 19 Pages, (English Translation Attached).
(Continued)

*Primary Examiner* — Raymond W Addie
(74) *Attorney, Agent, or Firm* — Brooks Kushman P.C.

(57) ABSTRACT

A road finishing machine with a thermographic device releasably fixed to a portion of the machine for recording a georeferenced thermographic data record of at least one region of a pavement layer. The thermographic device includes a housing in which a detection unit for detecting a thermographic data record and a further detection unit for detecting a space-related data record for the thermographic data record are disposed.

18 Claims, 8 Drawing Sheets

(51) Int. Cl.
*G01J 5/04* (2006.01)
*H04N 5/33* (2006.01)
*G06K 9/00* (2006.01)
*E01C 19/48* (2006.01)
*G01J 5/00* (2006.01)

(52) U.S. Cl.
CPC ............ *G06K 9/00791* (2013.01); *H04N 5/33* (2013.01); *E01C 19/48* (2013.01); *G01J 2005/0077* (2013.01); *G01J 2005/0081* (2013.01)

(58) Field of Classification Search
USPC ..................................... 404/84.05, 84.5, 118
See application file for complete search history.

(56) References Cited

U.S. PATENT DOCUMENTS

| | | | |
|---|---|---|---|
| 5,839,829 | A | 11/1998 | Litvin et al. |
| 5,947,636 | A | 9/1999 | Mara |
| 6,749,364 | B1 | 6/2004 | Baker et al. |
| 6,919,821 | B1 | 7/2005 | Smith |
| 6,979,146 | B2 | 12/2005 | Yamada et al. |
| 6,998,010 | B2 | 2/2006 | Wiley |
| 7,164,365 | B2 | 1/2007 | Doherty et al. |
| 7,172,363 | B2 | 2/2007 | Olson et al. |
| 7,613,528 | B2 | 11/2009 | Shirota |
| 7,911,881 | B2 | 3/2011 | Di Federico |
| 7,990,694 | B2 | 8/2011 | Goto |
| 8,099,218 | B2 | 1/2012 | Glee et al. |
| 8,562,246 | B2 | 10/2013 | Utterodt et al. |
| 8,568,058 | B2 | 10/2013 | Smieja |
| 8,714,869 | B1 | 5/2014 | Ries et al. |
| 8,801,325 | B1 | 8/2014 | Garland et al. |
| 8,890,713 | B2 | 11/2014 | Breuer et al. |
| 9,394,653 | B2 | 7/2016 | Rutz et al. |
| 2004/0075544 | A1 | 4/2004 | Janssen |
| 2009/0142133 | A1 | 6/2009 | Glee et al. |
| 2010/0189498 | A1 | 7/2010 | Doherty et al. |
| 2012/0246390 | A1 | 9/2012 | Kanai et al. |
| 2012/0321386 | A1 | 12/2012 | Hanfland et al. |

FOREIGN PATENT DOCUMENTS

| | | |
|---|---|---|
| DE | 202009016129 U1 | 3/2010 |
| EP | 2535458 A1 | 12/2012 |
| JP | 2008003467 A1 | 1/2008 |
| JP | 2009230244 A | 10/2009 |
| JP | 2010525321 A | 7/2010 |
| JP | 2012158920 A | 8/2012 |
| JP | 2013232216 A | 11/2013 |
| WO | 2011079208 A1 | 6/2011 |

OTHER PUBLICATIONS

E2—Nigemann, M., "Angewandter Straßenbau—Straßenfertiger im Einsatz", Springer Vieweg. Vieweg+Teuber Verlag, Wiesbaden, 2012, 21 Pages.
E3—Leica Geosystems AG, Heerbrugg, Schweiz: Prospekt bzw. Informationsbroschüre, "Leica Geosystems Paving Lösungen—Basissteuerungen für Fertiger", Stand 2007, abrufbar unter http://www.leica-geosystems.ch/de/758429de_Leica_Basic_Paving_Systems.pdf, 2 Pages (English Translation Attached).
E4—Leica Geosystems AG, Heerbrugg, Schweiz: Prospekt bzw. Informationsbroschüre, Leica iCON grade 32/42—Intelligente Systeme für Planiermaschinen, Stand 2012, abrufbar unter http://www.leica-geosystems.com/downloads123/zz/machine/general/brochures/Leica_iCON_grade_BRO_de.pdf, 2 Pages (English Translation Attached).
E6—Proceedings of the EIB W78-W102 International Conference in Sophia Antipolis, France, Oct. 26-28, 2011, Paper 113: "Visualization Workflow and Its Implementation at Asphalt Paving Construction Site", available at http://itc.scix.net/.data/works/att/w78-2011-Paper-113.pdf, 10 Pages.
E7—H.L. ter Huerne, A.G. Dorée & S.R. Miller: "Monitoring hot mix asphalt temperature to improve homogeneity and pavement quality" University of Twente, Enschede, The Netherlands, 2009,10 Pages.
European Communication Dated Jun. 25, 2015, Application No. 13163570.8-1604 /2789741, Applicant Joseph Vögele AG, 5 Pages.
Müller & Schubert, München, Berlin, Letter Dated Jun. 16, 2015, Application No. EP 13163570.8 (EP2789741A1), Applicant Joseph Voegele, 10 Pages.
Chinese Office Action Dated Nov. 3, 2015, Application No. 201410146183.8, Applicant Joseph Voegele AG, 5 Pages.
Japanese Office Action Dated Mar. 10, 2015, Application No. 2014-038165, Dispatch No. 112448, 4 Pages.
European Search Report Dated Sep. 12, 2013, Application No. EP 13 16 3570, 2 Pages.

ROAD FINISHING MACHINE WITH A THERMOGRAPHIC DEVICE

CROSS-REFERENCE TO RELATED APPLICATIONS

This application is a continuation of U.S. application Ser. No. 14/249,691 filed Apr. 10, 2014, which, in turn, claims foreign priority to European patent application number EP 13163570.8, filed Apr. 12, 2013, the disclosures of which are incorporated in their entirety by reference herein.

TECHNICAL FIELD

The present disclosure relates to a road finishing machine with a thermographic device.

BACKGROUND

From U.S. Pat. No. 6,749,364 B1, a road finishing machine with a thermal imaging camera is known. The thermal imaging camera is directed onto a newly laid asphalt layer behind the screed. The thermal imaging camera is coupled to a control unit which combines the thermographic data of the thermal imaging camera with positional data. The georeferenced data may be stored by the control unit and optionally sent to other road finishing vehicles or compacting vehicles via a telematic unit, on the basis of which the vehicles may adjust their respective paving parameters.

DE 20 2009 016 129 U1 discloses a device for measuring the temperature of the surface of hot asphalt. The device comprises a housing in which an infrared temperature sensing head is movably disposed. The latter is moved back and forth by means of a motor. This requires a complex bearing that must be lubricated regularly.

From DE 10 2008 058 481 A1, an asphalting system and method are known for setting up a plan for asphalting a working area based on a position temperature model. Here, a road finishing machine with a temperature sensor for detecting temperature data of a pavement layer and with a receiver for detecting positional data is disclosed. The temperature sensor is formed e.g., by an infrared camera. Preferably, the temperature sensor is fixed to the screed of the road finishing machine. Furthermore, the road finishing machine comprises an indicator on which the temperature data and the positional data may be indicated to the operator of the road finishing machine. The temperature data and the positional data may be forwarded to following compacting vehicles via a transmitter, so that said vehicles correspondingly adjust their compacting parameters. To detect the temperature data and the machine positional data, an unmanned drone could be employed according to a specific embodiment which drives over the asphalt layer or in the proximity of said asphalt layer.

In the respective optical detection systems of U.S. Pat. No. 6,749,364 B1 and DE 10 2008 058 481 A1, the devices provided for detecting the temperature data and positional data are mounted on the road finishing machine separately and are functionally connected to each other via a respective control unit. Cabling of said components among each other is time-consuming and complicated and may only be performed by an expert with special prior knowledge. Furthermore, the detection units for positional and temperature data disposed separately on the road finishing machine are unprotected which is why they are subject to increased wear due to the rough ambient conditions on site. In any way, these systems are deemed to be difficult to retrofit, where in particular the individual separated attachment, alignment and connection of the detection units for temperature and positional data may result in complications and extended assembly times. Quite often, the expensive detection units are damaged during installation, or they are not perfectly fixed.

SUMMARY

It is now an object of the present disclosure to provide a road finishing machine with a thermographic device which is embodied by means of simple structural means for detecting a heat image of a newly laid pavement layer, where these means are well protected and easily operated, may be easily retrofitted at different types of road finishing machines, and easily removed and replaced.

Improved further developments of the disclosure are given by the features of the subclaims.

The disclosure relates to a road finishing machine with a thermographic device releasably fixed to it for recording a georeferenced thermographic data record of at least one region of a pavement layer. According to at least one embodiment of the disclosure, the thermographic device comprises a housing in which a detection unit for detecting a thermographic data record and a further detection unit for detecting a space-related data record for the thermographic data record are disposed.

The thermographic device of the road finishing machine according to the disclosure forms a compact thermographic module which may be easily mounted to the road finishing machine and removed from the latter without requiring any special knowledge. This is in particular advantageous when it is important to retrofit a road finishing machine with the thermographic device or to remove it for servicing and storing purposes.

Moreover, the housing of the thermographic device offers excellent protection for the detection units for detecting the thermographic data record and for detecting the space-related data record. Furthermore, the housing provides sufficient heat protection for the components disposed therein.

The road finishing machine according to the disclosure is perfectly suited for generating a heat image of a newly laid pavement layer, where simple means are used which, thanks to the modular design, may be easily handled and put into operation by anyone.

Preferably, a box is provided inside the housing which is embodied for receiving moisture-sensitive assemblies of the thermographic device. According to a particularly preferred embodiment, the box is watertight and may in particular be closed by a sealing, preferably removable lid. In particular, the watertight box may be embodied for receiving an onboard computer, a power supply source and/or an RTK unit which will be described more in detail below. Preferably, watertight cable bushings are formed in the lid of the box and/or in the box itself. Thus, the assemblies located in the box may be particularly well protected from moisture, thus increasing their service lives. The box moreover provides a comparatively simple watertight structure which is easier to be made watertight than the overall housing. Components that are not located in the box but directly underneath the housing have a corresponding class of protection and are therefore also watertight.

It is also advantageous for at least one side wall of the watertight box to be integrally formed with the housing of the thermographic device, preferably integrally with a housing bottom of the thermographic device. This permits to arrange the box very stably in the housing of the thermographic device.

It may furthermore be advantageous to form an outlet in the housing, preferably at the lowermost point in the housing bottom, through which any penetrated water may drain. This prevents water from accumulating in the housing of the thermographic device which could lead to a damage and affect the function of the assemblies located therein. Moreover, the outlet offers an air intake option for the later described blower unit to suck in air for clearing the objective of the camera. Thereby, air may be provided for the blower unit in a simple manner.

According to an embodiment of the disclosure, the road finishing machine comprises a control platform with a roof at which the thermographic device is releasably fixed. There, an operator may easily access the thermographic device from the control platform to easily attach or remove it. The mounting of the thermographic device at the roof of the road finishing machine also offers sufficient distance to the screed to prevent rising vapors from the laid hot pavement layer from reaching the thermographic device. The exposed attachment of the thermographic device relative to the screed also prevents it from being exposed to excessive heat. The releasable mounting of the thermographic device at the roof also permits to quickly remove it for maintenance tasks. Finally, the thermographic device may detect a heat image of a large region on the pavement layer from the roof.

Preferably, the thermographic device comprises a fixing unit by which it may be releasably fixed to the road finishing machine. By the fixing unit, the thermographic device may be stably placed in its desired position even while the road finishing machine is driving. It is also advantageous for the fixing unit to comprise at least one supporting arm by which the thermographic device may be held at the road finishing machine sufficiently far to the rear above the screed. This permits the recording of a heat image of the freshly laid pavement layer directly behind the screed.

It is also possible to embody the fixing unit such that it fixes the housing of the thermographic device directly next to or on the roof of the road finishing machine to hold it as far away from the recording point as possible, whereby a larger surface or width of spread may be detected. Geometries of the objective can vary in particular by the distance, size and number of measuring fields, the angular coverage and/or obstacles in the measuring field.

According to a further embodiment of the disclosure, at least one mounting is provided at the roof of the road finishing machine for mounting the fixing unit of the thermographic device at it. During the assembly of the thermographic device at the roof of the road finishing machine, the fixing unit may first be positioned in the mounting such that it is perfectly aligned relative to the roof of the road finishing machine. As soon as the fixing unit of the thermographic device is positionally accurately aligned in the mounting of the roof, the fixing unit may, according to a further embodiment, be stably fixed to the roof or in the mounting of the roof by means of at least one threaded joint. This facilitates the assembly of the thermographic device at the road finishing machine for the operator, who does not depend on any assistance for this or for removing the thermographic device. Besides or instead of the threaded joint, the fixing unit of the thermographic device may also have alternative quick locks. For example, instead of or in addition to the threaded joint, a bayonet catch or a hook or shackle closure may be provided to mount the fixing unit positively and/or non-positively at the roof of the road finishing machine.

Preferably, the fixing unit of the thermographic device is designed such that in a first step, it may be suspended at the roof in oblong holes of a keyhole shape provided at the roof. If the thermographic device is hung up in this manner, it may be fixed with two screw levers without having to be held. According to a further embodiment of the disclosure, a mounting is provided by which the thermographic device may be held at the rear side of the road finishing machine at the roofs level. With such a mounting, the thermographic device can be positioned somewhat elevated in particular if the road finishing machine is designed without roof. Thereby, in such a finishing machine without roof, the thermographic device may be held at the same level as in a finishing machine with roof.

A further embodiment of the disclosure provides for an onboard computer to be disposed in the housing which is embodied to georeference the thermographic data record with the space-related data record. The housing takes care that the onboard computer is sufficiently protected from bad weather influences. Short calculation distances between the onboard computer and the two detection units that are also located in the housing permit the onboard computer to be able to georeference the thermographic data record with the space-related data record in real time. By the onboard computer being integrated in the housing of the thermographic device, the thermographic device may be easily employed in several road finishing machines and offers, thanks to its modular design, the option of retrofitting road finishing machines at which no thermographic device was provided up to now.

Preferably, a Linux operating system is installed in the onboard computer. It showed in practice that such an operating system may particularly quickly georeference the detected data records and is very reliable.

A further embodiment of the disclosure provides for the onboard computer to comprise at least one interface via which it may communicate with other units of the road finishing machine. In particular, the onboard computer may forward the georeferenced thermographic measuring results via the interface to a control unit of the road finishing machine, based on which results the control unit automatically adjusts and activates certain paving parameters, for example a tamper speed, screed leveling, a screed heating power and/or a speed of the spreading screw, resulting in an improved laying of the paving material and pavement layers of improved quality.

A further improvement of the disclosure provides for the interface to be embodied for unidirectional or bidirectional data communication. Thereby, the operator of the road finishing machine may even control the thermographic device himself/herself, for example to make shots of a purposefully selected region of the pavement layer behind the screed. It is also conceivable for the operator to control or activate the thermographic device by means of an operating device of the road finishing machine such that the thermographic device records heat image snapshots.

Preferably, the interface is a CAN-BUS interface by which in particular the total measuring results of the thermographic device may be quickly forwarded in particular to the control unit of the road finishing machine.

Preferably, the control unit of the road finishing machine may compute the georeferenced thermographic measuring results of the thermographic device with other measured data of the road finishing machine, for example with measured odometer data of the road finishing machine to compute a continuous heat image representation of the newly laid pavement layer along the covered paving distance of the road finishing machine.

In a further advantageous embodiment of the disclosure, the road finishing machine comprises a display on which all measuring results of the thermographic device may be indicated, preferably in real time and in colors. Preferably, inputs for controlling the thermographic device may be made on the display by means of a touch function. The display preferably also offers the possibility of suggesting improved paving parameters to the operator, e. g. a tamper speed, an adjustment of the leveling cylinders, and/or a speed of the spreading screw, based on the measuring results of the thermographic device, which suggestions may then be accepted or refused by the operator manually. This facilitates the optimal guidance of the road finishing machine for the operator.

It is also advantageous for the onboard computer to comprise at least one USB interface via which, for example, updates for the operating system may be installed on the onboard computer, and/or a storage medium, for example an external hard disk, may be connected which may optionally be inserted into the housing to store the measuring results of the thermographic device.

In a further embodiment of the disclosure, the onboard computer comprises a wireless interface, preferably a GSM- or Wi-Fi antenna, via which the onboard computer may be controlled wirelessly and wirelessly send measuring results of the thermographic device. This permits communication of the thermographic device with external units without direct connection.

For example, the onboard computer may send measuring results of the thermographic device via the wireless interface to a telematic system preferably based on GSM or Wi-Fi which, according to this embodiment, is installed between the road finishing machine and at least one following compacting vehicle along the paving section. This permits data exchange among the respective site vehicles based on which an adaptation of different working parameters may be performed at the respective vehicles. For example, a compacting vehicle which is integrated in the telematic system may adapt its rolling pattern to the georeferenced thermographic data detection of the preceding road finishing machine.

A space-related heat image may be produced by means of the thermographic device of the road finishing machine according to the disclosure for a wide region of the pavement layer in particular when the detection unit for detecting the thermographic data record includes an infrared camera. The infrared camera permits to quickly produce an accurate heat image over a complete region of the pavement layer behind the screed without having to move said camera within the housing for this.

It is also possible to install several infrared cameras, for example two infrared cameras, in the housing of the thermographic device to detect a particularly large paving region. In this case, each infrared camera could detect a certain measuring range, the onboard computer provided in the thermographic device computing the respective measuring ranges together to obtain the heat image of the complete measuring range to be detected.

Preferably, the camera's measuring range (setting angle) may be adjusted, optionally automatically, depending on the variable screed's width of spread of the road finishing machine. Thereby, the camera's measuring range may be individually adapted to different screed widths, which is in particular of advantage if the thermographic device is used in different road finishing machines.

It is particularly advantageous for the infrared camera to be rigidly disposed in the housing; thus additional drive units for moving the camera may be eliminated. By the infrared camera being rigidly disposed in the housing of the thermographic device, the thermographic device itself is even robust on a bumpy roadway.

Optionally, the orientation of the infrared camera may be changed manually or by motors to scan different road widths. Such an adjustment of the infrared camera, however, would not be performed continuously during recording, but only to orient it before recording is started. Thus, no signs of wear must be expected at the infrared camera, in particular at its bearing. So, the adjustment of the infrared camera mainly serves to adjust the distance of the measuring point to the finishing machine's screed, where depending on the distance of the measuring point to the finishing machine's screed, the width of the detection range of the camera may be adjusted. By increasing the distance of the measuring point, the width of the detection range of the camera may also be increased.

In an improved embodiment of the disclosure, a blower is provided in the housing to clear, for example, the detection unit for detecting the thermographic data record from precipitations and in particular to protect the objective of the thermographic camera from the precipitation of aerosols. Precipitations on the objective lead to a deterioration of the shot and may falsify the measured values. The blower may prevent this. Thereby, service intervals (cleaning of the objective) may be in particular extended, leading to reduced maintenance costs of the thermographic device. The blower may be driven by direct or alternating current from an energy source of the road finishing machine. As an alternative, the blower may also comprise a separate electric drive, for example a battery, or be fed by a power supply unit separately disposed in the housing.

According to a further embodiment of the disclosure, the blower unit comprises a filter to keep aerosols away from the camera. Thereby, the blower unit may blow a particularly clean air flow to the lens of the infrared camera to clear it from precipitation.

To obtain a particularly quick and directed air flow by means of the blower, the blower may comprise a nozzle which is, for example, directed onto the lens of the infrared camera to prevent the latter from steaming up. As a positive side effect, the blower permits an effective cooling of the camera.

It is also possible for the lens of the infrared camera to be aligned relative to or in an aperture in the housing with which the lens forms a kind of slit diaphragm through which an air flow of the blower unit may flow to form a continuous air flow around the lens. This permits to keep the lens of the infrared camera clear from precipitations, in particular aerosols.

A positionally accurate georeferencing of the measured thermographic data is in particular possible if the detection unit for detecting the space-related data record includes a Global Navigation Satellite System (GNSS) receiver. The latter may be embodied, for example, as a Global Positioning System (GPS) receiver and be preferably additionally supplemented by a Real Time Kinematic (RTK) radio receiver by which the GPS coordinates may be corrected with very high accuracy. For example, via the integrated RTK radio receiver, correction data may be received from a local base station. As an alternative, the use of other correction data services is also possible. The common use of an RTK radio receiver and a GNSS receiver permits, based on the georeferenced thermographic measuring results of the thermographic device, a precise navigation of the wirelessly connected compacting vehicle(s), and an optimal adaptation of the paving parameters at the road finishing machine.

The thermographic device of the road finishing machine according to the disclosure is particularly inexpensive and easy to assemble if the housing comprises a first and a second housing shell. The two housing shells may be embodied, for example, as plastic shells which preferably may be manufactured by injection molding.

Preferably, the first and second housing shells are releasably connected to each other, so that they may be easily disassembled for servicing the thermographic device to permit the servicing personnel easy access to the apparatuses located therein, for example to replace or clean the filter of the blower.

According to a further embodiment of the disclosure, a sealing ring is clamped between the two housing shells. Said ring provides a watertight closure of the two housing shells. Moreover, by its dampening effect, the sealing ring prevents noise from developing at the housing of the thermographic device during the paving drive.

Preferably, a window is embodied in the housing of the thermographic device, behind which the lens of the infrared camera is located. The window may be embodied either in the first and/or in the second housing shell.

According to a further embodiment of the disclosure, it would be possible to provide several thin tear-off foils on the window, or instead of the window, which may be torn off—as is common with tear-off visors for motorcycle helmets or Formula 1 helmets—one after the other when dirt, e.g., aerosols, adhere to it to provide a clear view for the camera's objective. In such an embodiment, it would be even possible to eliminate the above mentioned blower leading to a simplified construction of the thermographic device.

Embodiments of the disclosure will be illustrated in detail with reference to the attached drawings.

DETAILED DESCRIPTION

Figure 1:
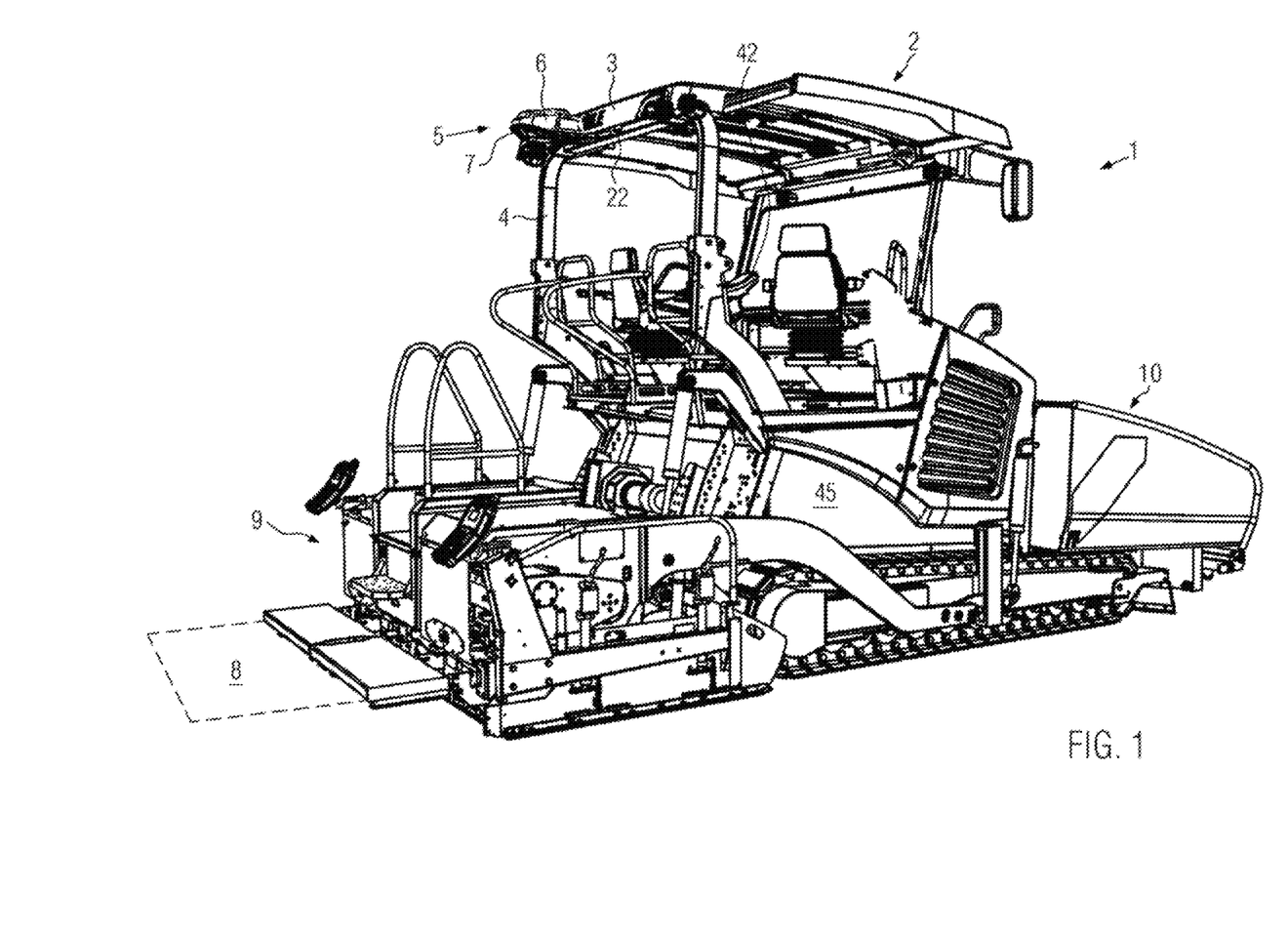
FIG. 1 shows a road finishing machine according to the disclosure with a thermographic device.

FIG. 1 shows a road finishing machine 1 according to the disclosure. The road finishing machine 1 comprises a control platform 2 with a roof 3 which is supported by a frame 4 of the control platform 2. A thermographic device 5 is fastened at the roof 3 of the control platform 2. The thermographic device 5 comprises a housing 6 with a window 7. The window 7 is directed to a region 8 behind a screed 9. During the paving drive, the region 8 is located on a pavement layer which is newly laid by the road finishing machine 1.

Paving material is transported from a material bunker 10 via a non-depicted conveyor device underneath the control platform 2 through a chassis 45 of the road finishing machine 1 to the rear to the screed 9 by which it is processed into a new pavement layer on which the region 8 photographed by the thermographic device 5 is located.

Figure 2:
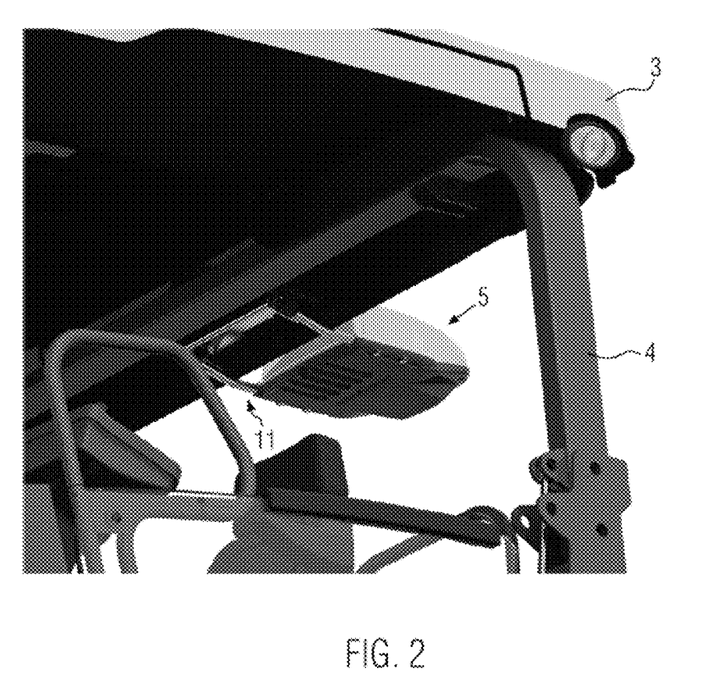
FIG. 2 shows a first perspective representation of the road finishing machine according to the disclosure with the thermographic device.

FIG. 2 shows the thermographic device 5 fixed to the roof 3 of the control platform 2 in a perspective representation. The thermographic device 5 is fixed to the roof 3 of the road finishing machine 1 by means of a fixing unit 11. It is of course also possible to fix the thermographic device 5 directly at the frame 4 of the control platform 2 by means of the fixing unit 11. In FIG. 2, the thermographic device 5 is fixed by means of the fixing unit 11 so as to project rearwards relative to the roof 3. As an alternative, the thermographic device 5 could also directly rest on the roof 3 with its housing 6 and be, for example, fixed in an indentation provided for this or at a rail provided on the roof 3. The mounting of the thermographic device 5 underneath the roof 3 according to FIG. 2, however, permits an operator to easily access the thermographic device 5 and the fixing unit 11 of the thermographic device from the control platform 2, which is of assistance for the operator in particular for assembly or disassembly.

Figure 3:
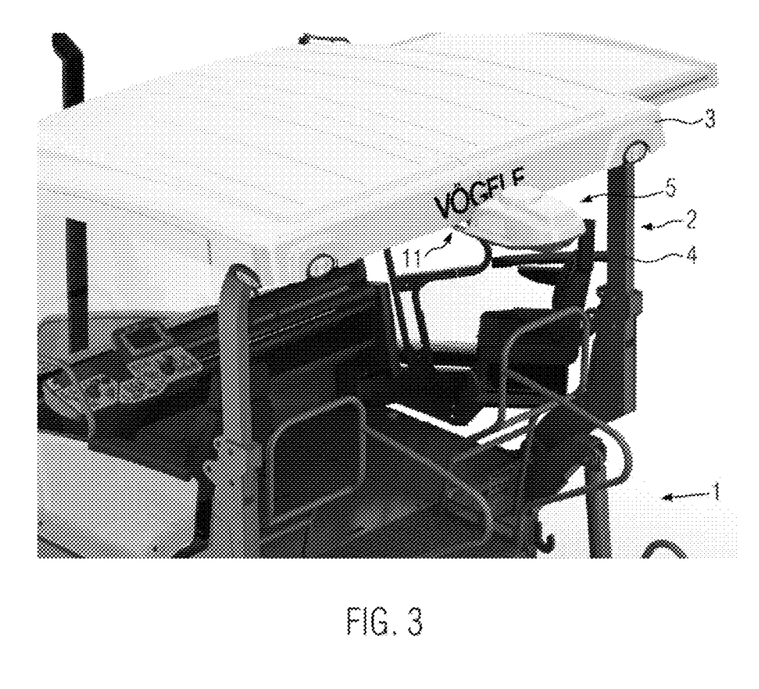
FIG. 3 shows a further perspective view of the road finishing machine according to the disclosure with the thermographic device.

A further perspective representation of the thermographic device 5 fixed to the roof 3 of the road finishing machine 1 is shown in FIG. 3. As in FIG. 2, one can also easily see in FIG. 3 that the thermographic device 5 is held by the fixing unit 11 so as to project rearwards beyond the screed 9. One can also see in FIG. 3 that the thermographic device 5 is fixed essentially centrically at the roof 3.

Figure 4:
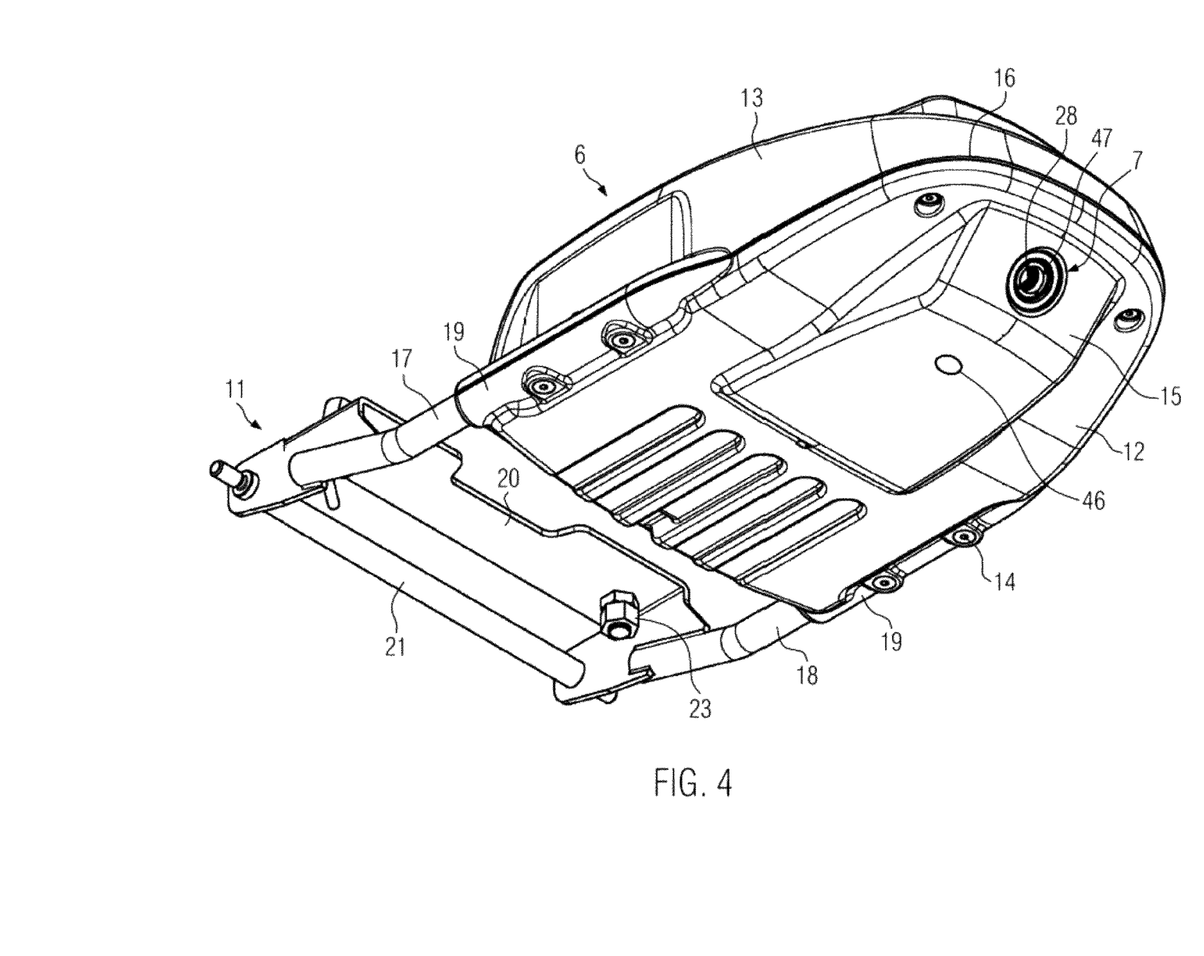
FIG. 4 shows a first perspective representation of the thermographic device from below.

FIG. 4 shows a perspective representation of the thermographic device 5 from the bottom. The housing 6 of the thermographic device 5 has first and second, or lower and upper, housing shells 12, 13. The lower and upper housing shells 12, 13 are releasably assembled by means of screws 14. The lower housing shell 12 comprises a cavity 15 in which the window 7 is provided. The purpose of the cavity 15 is in particular to accommodate at least one detection unit for detecting the thermographic data record and align it to the window 7, which will be illustrated more in detail below. Between the lower and the upper housing shells 12, 13, a sealing ring 16 is provided which is clamped between the housing shells 12, 13 such that a watertight closure is possible along the sealing ring 16.

FIG. 4 also shows that the fixing unit 11 comprises first and second bows 17, 18 projecting out of the housing 6 of the thermographic device 5. The bows 17, 18 are slightly bent and fixed in mountings 19 provided for this which are embodied between the lower and the upper housing shells 12, 13. In FIG. 4, the bows 17, 18 are retained in the mountings 19 by the screws 14. At the ends of the bows 17, 18 facing away from the housing 6, a mounting plate 20 is provided. The latter may be welded, for example, to the ends of the bows 17, 18. The mounting plate 20 supports a bar 21 which, just like the mounting plate 20 itself, belongs to a quick lock system to releasably fix the thermographic device 5 at the roof 3 or at the frame 4 of the control platform 2. To releasably fix the thermographic device 5, the bar 21 is inserted into at least one hook mounting 22 (see FIG. 1). The hook mounting 22 is embodied at the roof 3 or at the frame 4 of the control platform 2. One can furthermore see in FIG.

4 that a threaded joint 23 is formed at the mounting plate 20 which is also present on the other side of the mounting plate 20 but concealed by the bow 17. By means of said threaded joint 23, the thermographic device may be releasably secured to the roof 3 or the frame 4.

The bar 21 and/or the mounting plate 20 of the fixing unit 11 may be used by the operator as positioning aid to align the thermographic device 5 relative to the control platform 2 of the road finishing machine 1 before the operator finally secures the thermographic device 5 at the control platform 2 of the road finishing machine 1 by means of said threaded joint 23. This permits the operator to easily mount the thermographic device 5 at the control platform 2 of the road finishing machine 1.

Figure 5:
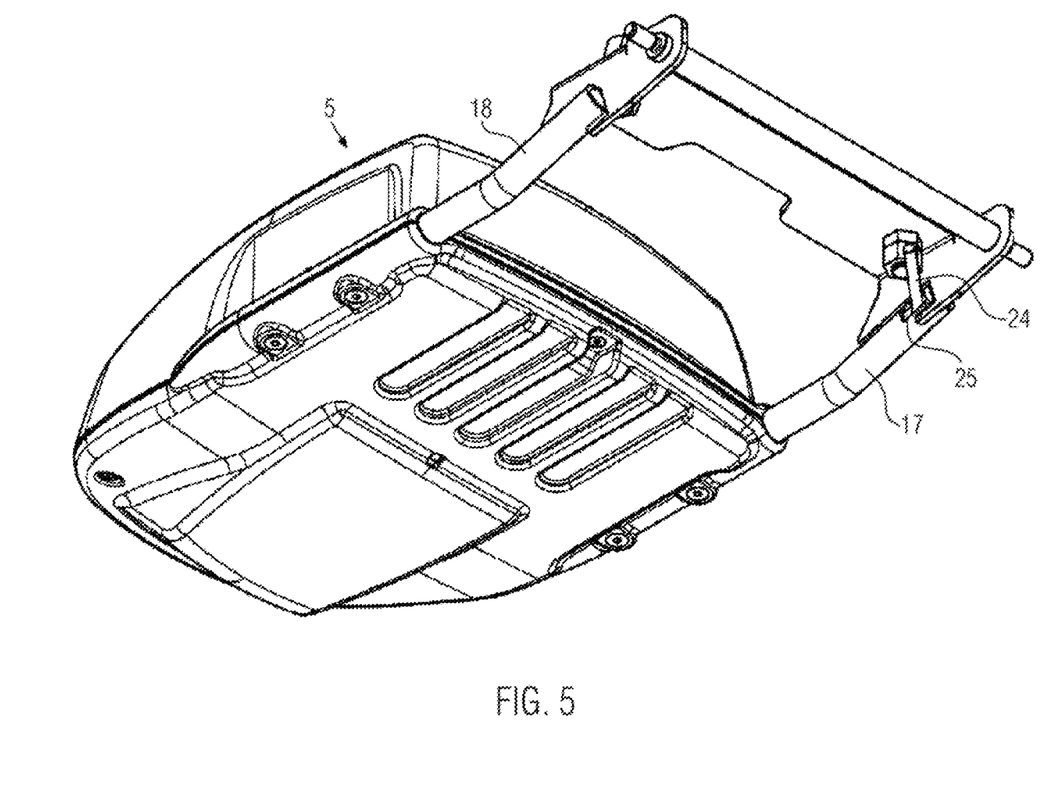
FIG. 5 shows a second perspective representation of the thermographic device from below.

FIG. 5 shows a further perspective representation of the thermographic device 5 from the bottom. One can easily see in FIG. 5 that the bows 17, 18 are embodied as tube sections. The bow 17 receives a cable 24 inside its tube section which extends into the interior of the housing 6 of the thermographic device 5. The cable 24 extends through an opening 25 of the bow 17 to the exterior. The cable 24 may be embodied as electric supply cable and/or as preferably bidirectional data communication cable and connects at least a portion of the units disposed in the housing 6 with the road finishing machine 1.

Figure 6:
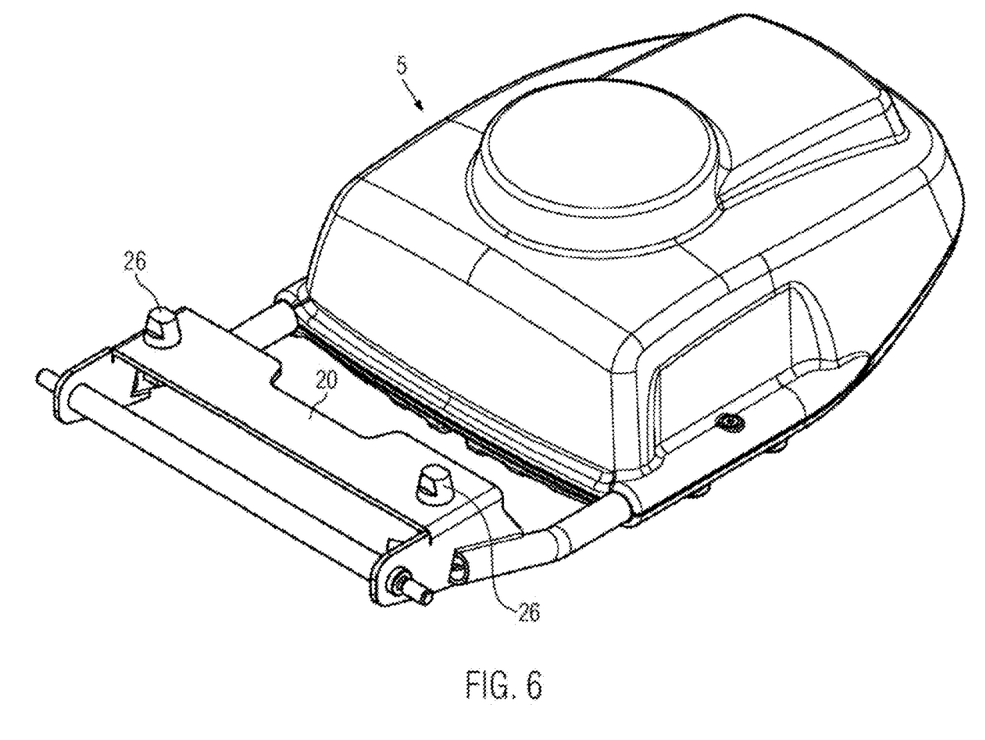
FIG. 6 shows a third perspective representation of the thermographic device from above.

FIG. 6 shows schematic fixtures 26 for the suspension in the above-mentioned mountings in the form of a keyhole. The fixtures 26 preferably have the shape of a mushroom and may therefore be positively inserted into the mountings of a keyhole shape. By the fixtures 26, the thermographic module 5 may be hung up at the roof of the road finishing machine 1, so that a fastening with non-depicted clamp levers as quick lock is possible without simultaneously having to lift the thermographic module 5.

Figure 7:
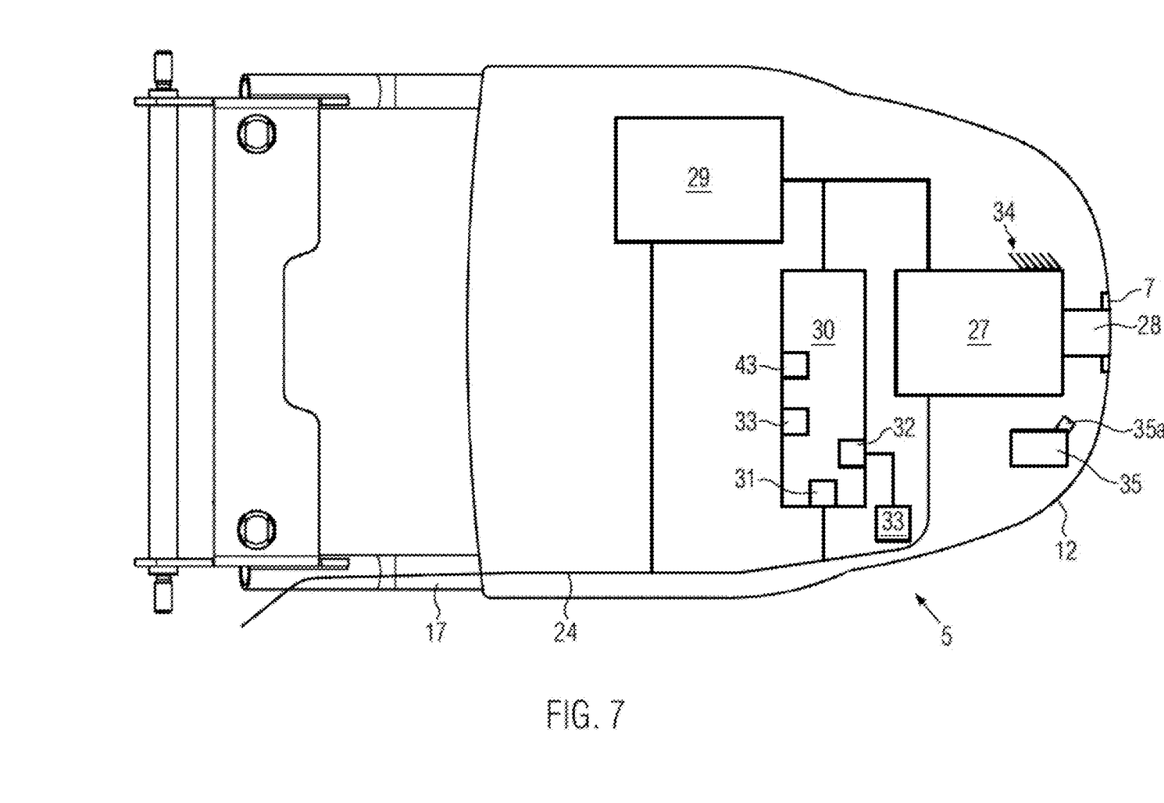
FIG. 7 shows an open representation of the thermographic device with paving components.

FIG. 7 shows a schematic representation of the thermographic device 5 without the upper housing shell 13 and the box 41 from above. By the upper housing shell 13 being removed, the inner components of the thermographic device 5 are visible. In particular, an infrared camera 27 with a lens 28 is arranged on the lower shell 12 of the thermographic device 5. The lens 28 is oriented towards the window 7.

Figure 8:
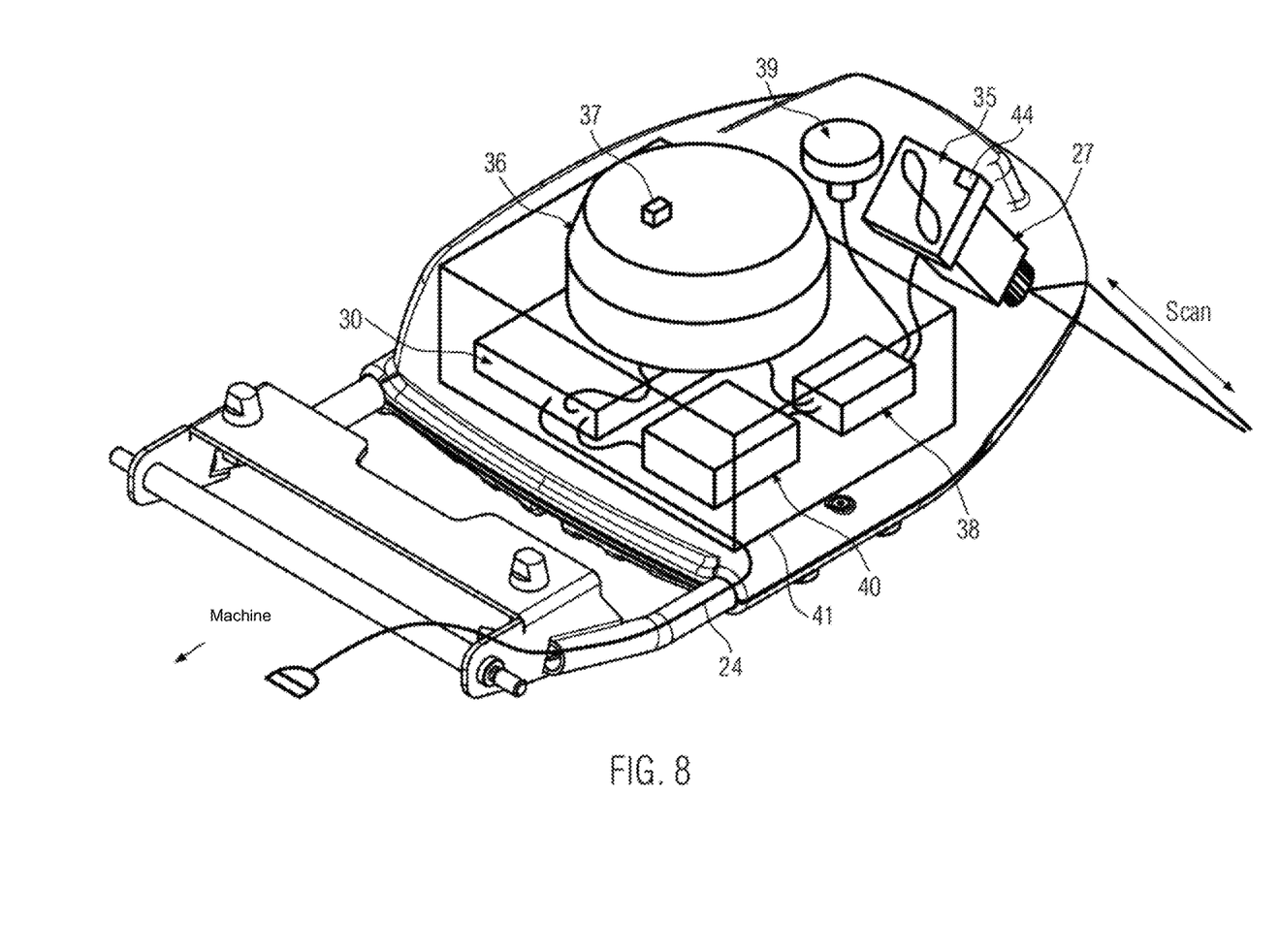
FIG. 8 shows a perspective representation of the thermographic device with a view into the interior of the housing.

The infrared camera 27 is connected to the onboard computer 30 which is located, according to FIG. 8, in the watertight box 41 within the thermographic module 5. The RTK receiver 38 is also located there and is also connected to the onboard computer 30, as also is the central power supply 40 for all electric components of the thermographic module 5. The data/supply cable 24 extends from the box 41 to the road finishing machine. The onboard computer 30 may be controlled from the road finishing machine 1 via the cable 24. The onboard computer 30 in turn controls all functions within the thermographic module 5. In this manner, the thermographic module 5 may optionally also operate independently, for example on other machines than the own ones. Moreover, via the cable 24, thermographic measured data may be sent from the infrared camera 27 to the road finishing machine 1 and then be imaged on a display 42 on the road finishing machine 1 which is not shown in FIG. 7. Such a display 42 is shown in FIG. 1.

The lens 28 of the infrared camera 27 is aligned with the window 7 of the housing 6 such that the infrared camera 27 may detect a perfect heat image, for example of the region 8 shown in FIG. 1.

FIG. 7 also shows a detection unit 29 for detecting a space-related data record for the thermographic data record which may be detected by means of the infrared camera 27. The detection unit 29 is also connected with the cable 24.

The detection unit 29 preferably comprises a GNSS receiver which is, for example, a GPS receiver which is optionally supplemented by an RTK radio receiver for generating a high-precision positional data determination. In case of an integrated RTK radio receiver, correction data may also be received from a local base station. As an alternative, the use of other correction data services is also possible.

In the housing 6 of the thermographic device 5, an onboard computer 30 is furthermore disposed according to FIG. 7. The onboard computer 30 is connected via the cable 24 with the detection unit 27, which is embodied as infrared camera, and with the detection unit 29 for detecting the space-related measured data for the thermographic data record. The onboard computer 30 is in particular embodied to compute the detected data records of the detection units 27, 29 together to produce a georeferenced thermographic data record which may be transmitted via the cable 24, for example, to a control unit of the road finishing machine 1. Furthermore, the settings of the RTK receiver 38 (e. g. the receiver channel) and the GPS receiver 36 may be carried out via the computer 30. Preferably, the onboard computer 30 uses the screed width determined by a screed width measuring unit to restrict the thermographic data of the camera, in particular the width of the heat image, to the screed width.

FIG. 7 also shows that the onboard computer 30 comprises an interface 31. The interface 31 may be, for example, a CAN bus interface via which the onboard computer 30 may be controlled from the road finishing machine 1 via the cable 24 to make, for example, snapshots with the infrared camera 27 functionally coupled to it. Equally, measuring results of the detection units 27, 29 may be computed by the onboard computer 30 and automatically sent via the CAN bus interface 31 and the cable 24 to the road finishing machine 1 which uses the measuring results, for example, for improving paving parameters.

The onboard computer 30 represented in FIG. 7 furthermore comprises a USB interface 32 which is connected with a storage medium 33 on which georeferenced thermographic data records may be stored by the onboard computer 30. Equally, the onboard computer 30 is designed, according to one embodiment, to retrieve scheduled measured data records from the storage medium 33 and compare them with the currently detected georeferenced thermographic data records. By such comparison, the onboard computer 30 may preferably emit recommendations to the road finishing machine 1 via the cable 24, for example indicating how to change paving parameters.

It is also possible to install, via the USB interface 32, an update for the operating system of the onboard computer 30.

The onboard computer 30 according to FIG. 7 also comprises a wireless interface 43 which sends, for example via GSM or Wi-Fi, measured data records of the georeferenced thermographic shots of the region 8 wirelessly to one or several following compacting vehicle(s) or to a telematic system. As an alternative, it would also be conceivable, however, to send the georeferenced thermographic data first from the onboard computer via the cable 24 to a control unit of the road finishing machine 1, from where the data are sent through a wireless interface provided on board of the road finishing machine 1.

One can also see in FIG. 7 that the detection unit 27 for detecting the thermographic data record, which preferably comprises an infrared camera, is rigidly fixed in the housing 6, in particular in the lower housing shell 12, with a fixed bearing 34. A rigid mounting of the detection unit 27 leads to an exact shot of a heat image above the region 8 and also prevents the detection unit 27 from shifting. As an alternative, a movable, preferably latching mounting is conceivable for the infrared camera which permits to cover at least two different regions of paving widths:

Region Small:

The camera shows a region near the screed 9 of the road finishing machine 1. The distance of the measuring points to the camera is small. Thus, the scanned width is small.

Region Large:

The camera shows a region further behind the screed 9. The distance of the measuring points to the camera is long. Thus, the scanned width is also larger.

As an alternative, the camera could also be moved by motors—controlled via the onboard computer 30—to thus adjust an adequate measuring position.

Next to the detection unit 27, a blower 35 is disposed in the lower housing shell 12. The purpose of the blower 35 is to prevent precipitations from forming within the housing 6 of the thermographic device 5, in particular in the region of the window 7 and the lens 28 of the infrared camera 27. The blower 35 is connected with the cable 24 in FIG. 7 via which it may be supplied with power. As an alternative, a separate energy source, for example a battery, may be provided in the blower 35. For a directed and strong air flow, the blower 35 may comprise a nozzle 35a by which in particular the window 7 and the lens 28 may be cleared from precipitations. To prevent excessive pressure from building up in the housing 6 of the thermographic device 5, the air flow sent by the blower 35 may escape through the tube sections of the bows 17, 18 to the outside under the roof 3 of the road finishing machine 1. By the tube sections of the bows 17, 18 extending to below the roof 3 of the road finishing machine 1, moisture cannot penetrate from above into the tube sections and thus into the housing 6 of the thermographic device 5.

According to one embodiment of the disclosure, the blower 35 blows an air flow through a circular nozzle 47 (see FIG. 4) around the lens 28. By this flush with air, the lens 28 of the camera 27 is protected from aerosols (bitumen). The blower 35 obtains the air (suction) essentially through an aperture 46 (water drain) attached at the lowermost position of the housing bottom (FIG. 4) and through the tube which contains the data/supply cable 24. As aerosols may also be contained in the sucked-in air, the blower 35 has a filter 44 which is located upstream of the blower 35.

The thermographic device 5 which essentially comprises, seen from the outside, the housing 6 and the fixing unit 11 forms a modular design which is optimally suited to be retrofitted at different road finishing machines. For maintenance and servicing purposes, or as a protection against theft, the thermographic device 5 may moreover be quickly removed from the road finishing machine 1 and also be easily mounted to it again. This is advantageous if the road finishing machine is to be put out of operation or transported. By its compact design, the thermographic device 5 at the road finishing machine 1 according to the disclosure mainly offers the advantage of not making itself felt in the operation of the road finishing machine by its size or arrangement at the road finishing machine 1, where other functional assemblies and measuring systems of the road finishing machine 1 are not restricted in any way by the thermographic device 5.

FIG. 8 shows another schematic perspective representation of an optional thermographic device 5 of the road finishing machine according to the disclosure, where through the upper housing shell 13, one can see the interior of the housing 6 and the box 41 of the thermographic device 5. Inside the housing 6, the onboard computer 30, the infrared camera 27, the blower 35, a GPS receiver 36 with an integrated antenna 37, an RTK receiver 38 with an RTK antenna 39 connected to it, and a power supply 40 are arranged. To stably mount the individual components in the housing 6 of the thermographic device 5, the box 41 is installed in the space of the housing 6. The box 41, however, may also be embodied as support plate to offer a stable mounting for the individual components. The measured thermographic data georeferenced by the onboard computer 30 may be sent via the cable 24 through the tube section of the bow 17 to a control unit provided at the road finishing machine 1.

According to FIG. 8, the total electric energy for the operation of the electric components within the housing 6 is supplied by the power supply 40. This mainly offers the advantage that the thermographic device 5 does not depend on power supply from outside the housing 6, improving its flexible applicability in different road finishing machines.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A road finishing machine comprising:
a thermographic device releasably fixed to a portion of the road finishing machine for recording a georeferenced thermographic data record of at least one region of a pavement layer, the thermographic device comprising a housing, a detection unit disposed in the housing for detecting a thermographic data record, and an additional detection unit disposed in the housing for detecting a space-related data record for the thermographic data record, wherein the detection unit for detecting the thermographic data record comprises an infrared camera.

2. The road finishing machine according to claim 1 wherein the road finishing machine comprises a control platform with a roof, and the thermographic device is releasably fixed to the roof.

3. The road finishing machine according to claim 1 wherein the thermographic device comprises a fixing unit by which the thermographic device may be releasably fixed to the road finishing machine.

4. The road finishing machine according to claim 1 wherein the thermographic device further comprises an onboard computer arranged in the housing and designed to georeference the thermographic data record with the space-related data record.

5. The road finishing machine according to claim 4 wherein a LINUX operating system is installed in the onboard computer.

6. The road finishing machine according to claim 4 wherein the onboard computer comprises at least one interface via which the onboard computer may communicate with other units of the road finishing machine.

7. The road finishing machine according to claim 6 wherein the at least one interface is embodied for unidirectional or bidirectional data communication.

8. The road finishing machine according to claim 7 wherein the at least one interface comprises a CAN-BUS interface.

9. The road finishing machine according to claim 1 wherein the infrared camera is rigidly arranged in the housing.

10. The road finishing machine according to claim 1 wherein the thermographic device further comprises a blower in the housing for clearing precipitations from the detection unit for detecting the thermographic data record.

11. The road finishing machine according to claim 10 wherein the blower comprises a nozzle.

12. The road finishing machine according to claim 1 wherein the additional detection unit for detecting the space-related data record comprises a GNSS receiver.

13. The road finishing machine according to claim 1 wherein the housing of the thermographic device comprises a first housing shell and a second housing shell.

14. The road finishing machine according to claim 1 wherein the thermographic device further comprises a box in the housing, and the box is sealed in a watertight manner.

15. The road finishing machine according to claim 1 wherein the thermographic device further comprises another detection unit disposed in the housing for detecting a thermographic data record.

16. The road finishing machine according to claim 1 wherein a setting angle of the detection unit for detecting the thermographic data record may be adjusted depending on a screed paving width of the road finishing machine.

17. The road finishing machine according to claim 16 wherein the setting angle comprises a measuring range of the detection unit for detecting a thermographic data record.

18. The road finishing machine according to claim 1 wherein the thermographic device may be mounted to a chassis of the road finishing machine by means of a mounting, and wherein the thermographic device may be positioned by means of the mounting essentially at a level of a roof of the road finishing machine.

\* \* \* \* \*